United States Patent
Brown et al.

(10) Patent No.: US 9,940,495 B2
(45) Date of Patent: Apr. 10, 2018

(54) OPTICAL READER DEVICE, TAG FOR USE ON A DISPOSABLE OR REPLACEABLE COMPONENT, OPTICAL DATA VALIDATION SYSTEM AND METHOD FOR OPTICAL DATA VALIDATION

(71) Applicant: ams AG, Unterpremstaetten (AT)

(72) Inventors: Norwood Brown, Plano, TX (US); Kevin Nohovig, Milford, MI (US); Nathan Lester, Ashland, MA (US)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 15/340,865

(22) Filed: Nov. 1, 2016

(65) Prior Publication Data

US 2017/0132440 A1   May 11, 2017

Related U.S. Application Data

(60) Provisional application No. 62/252,030, filed on Nov. 6, 2015.

(30) Foreign Application Priority Data

Dec. 8, 2015  (EP) .................................. 15198476

(51) Int. Cl.
   *G06K 7/10*   (2006.01)
   *G06K 9/00*   (2006.01)

(52) U.S. Cl.
   CPC ..... *G06K 7/10564* (2013.01); *G06K 7/10544* (2013.01); *G06K 9/00523* (2013.01)

(58) Field of Classification Search
   CPC ........... G06K 9/00523; G06K 7/10544; G06K 7/10564; G06K 2009/0059; G06K 2009/06225
   See application file for complete search history.

(56) References Cited

U.S. PATENT DOCUMENTS

| | | | | |
|---|---|---|---|---|
| 4,288,701 A | * | 9/1981 | Hill ..................... | G06K 7/10762 235/462.21 |
| 5,095,197 A | * | 3/1992 | Chadima, Jr. ...... | G06K 7/10594 235/455 |

(Continued)

FOREIGN PATENT DOCUMENTS

| WO | 0012229 A1 | 3/2000 |
|---|---|---|
| WO | 2015008256 A1 | 1/2015 |

*Primary Examiner* — Daniel Walsh
(74) *Attorney, Agent, or Firm* — McDermott Will & Emery LLP

(57) ABSTRACT

The presented principles relate to an optical reader device, to a tag for use on a disposable or replaceable component, to an optical data validation system and to a method for optical data validation. The optical reader device comprises a sensor unit and a signal processing unit. In particular, the sensor unit comprises a light source and an optical sensor arrangement. The light source comprises at least one light emitting component and is arranged for emitting light. The optical sensor arrangement is arranged for generating a first sensor signal indicative of light emitted from the light source and reflected back from a code marking of a tag to be placed in front of the light source in a determined distance. The optical sensor is further arranged for generating a second sensor signal indicative of light emitted by a photo-responsive taggant of the tag after being excited by the light emitted from the light source. The signal processing unit comprises a signal processing unit being arranged to process the first sensor signal and the second sensor signal.

15 Claims, 3 Drawing Sheets

(56) References Cited

U.S. PATENT DOCUMENTS

| | | | | |
|---|---|---|---|---|
| 5,619,026 | A * | 4/1997 | Chou | G06K 7/12 |
| | | | | 235/462.04 |
| 6,296,189 | B1 * | 10/2001 | Lawandy | B07C 5/3412 |
| | | | | 235/491 |
| 6,759,173 | B2 * | 7/2004 | Sherrer | B81C 1/00404 |
| | | | | 257/E23.179 |
| 6,970,267 | B1 | 11/2005 | Scanlon | |
| 7,182,451 | B2 * | 2/2007 | Auslander | B41M 3/14 |
| | | | | 235/491 |
| 7,441,704 | B2 * | 10/2008 | Ross | G06K 19/06009 |
| | | | | 235/454 |
| 7,593,097 | B2 | 9/2009 | Robinson et al. | |
| 7,773,749 | B1 | 8/2010 | Durst et al. | |
| 7,881,553 | B2 | 2/2011 | Ishii | |
| 7,938,331 | B2 * | 5/2011 | Brock | G07D 7/0026 |
| | | | | 235/462.01 |
| 8,293,539 | B2 | 10/2012 | Petrich et al. | |
| 8,550,352 | B2 * | 10/2013 | Guo | G06K 7/10851 |
| | | | | 235/462.1 |
| 8,653,479 | B2 | 2/2014 | Carroll et al. | |
| 9,594,994 | B2 * | 3/2017 | Biro | G07D 7/2041 |
| 2002/0020746 | A1 * | 2/2002 | Roustaei | G06K 7/10544 |
| | | | | 235/462.01 |
| 2002/0044689 | A1 * | 4/2002 | Roustaei | G03F 7/705 |
| | | | | 382/199 |
| 2003/0006170 | A1 * | 1/2003 | Lawandy | B07C 5/3412 |
| | | | | 209/3.3 |
| 2003/0062413 | A1 * | 4/2003 | Gardiner | G06K 7/10732 |
| | | | | 235/454 |
| 2004/0175052 | A1 * | 9/2004 | Bian | G06K 7/14 |
| | | | | 382/254 |
| 2005/0023356 | A1 * | 2/2005 | Wiklof | G06K 7/10564 |
| | | | | 235/462.42 |
| 2005/0045725 | A1 * | 3/2005 | Gurevich | G06K 7/10811 |
| | | | | 235/454 |
| 2005/0284944 | A1 * | 12/2005 | Ming | G06K 19/06037 |
| | | | | 235/494 |
| 2007/0119950 | A1 * | 5/2007 | Auslander | G06K 19/06018 |
| | | | | 235/486 |
| 2007/0119951 | A1 * | 5/2007 | Auslander | G06K 19/06046 |
| | | | | 235/491 |
| 2007/0228176 | A1 * | 10/2007 | Vinogradov | G06K 7/10722 |
| | | | | 235/462.46 |
| 2008/0265033 | A1 * | 10/2008 | Shintani | H04N 1/1934 |
| | | | | 235/454 |
| 2009/0020609 | A1 * | 1/2009 | Cohen | G06K 7/1095 |
| | | | | 235/462.01 |
| 2009/0194594 | A1 | 8/2009 | Laser | |
| 2010/0084469 | A1 * | 4/2010 | Kuyper-Hammond | G06K 19/06037 |
| | | | | 235/462.01 |
| 2010/0200658 | A1 * | 8/2010 | Olmstead | G06K 7/10722 |
| | | | | 235/455 |
| 2010/0270380 | A1 * | 10/2010 | Komarek | B42D 25/43 |
| | | | | 235/491 |
| 2011/0155808 | A1 * | 6/2011 | Santos | G06K 7/146 |
| | | | | 235/462.15 |
| 2011/0290878 | A1 * | 12/2011 | Sun | G06K 7/14 |
| | | | | 235/437 |
| 2012/0118969 | A1 * | 5/2012 | Zolotov | G06K 7/10722 |
| | | | | 235/462.04 |
| 2012/0118970 | A1 * | 5/2012 | Zolotov | G06K 7/10722 |
| | | | | 235/462.04 |
| 2012/0298753 | A1 * | 11/2012 | Zolotov | G06K 7/10722 |
| | | | | 235/462.04 |
| 2012/0312877 | A1 * | 12/2012 | Zolotov | G06K 7/10722 |
| | | | | 235/462.04 |
| 2013/0277428 | A1 * | 10/2013 | Meng | G06K 7/10732 |
| | | | | 235/440 |
| 2014/0209685 | A1 * | 7/2014 | Venkatesha | G06K 19/06131 |
| | | | | 235/462.04 |
| 2016/0162907 | A1 * | 6/2016 | Liu | G06K 7/10722 |
| | | | | 235/462.41 |
| 2017/0124441 | A1 * | 5/2017 | Picard | G06K 19/06037 |
| 2017/0132440 | A1 * | 5/2017 | Brown | G06K 7/10564 |
| 2017/0193260 | A1 * | 7/2017 | Prusik | G06K 7/1473 |

* cited by examiner

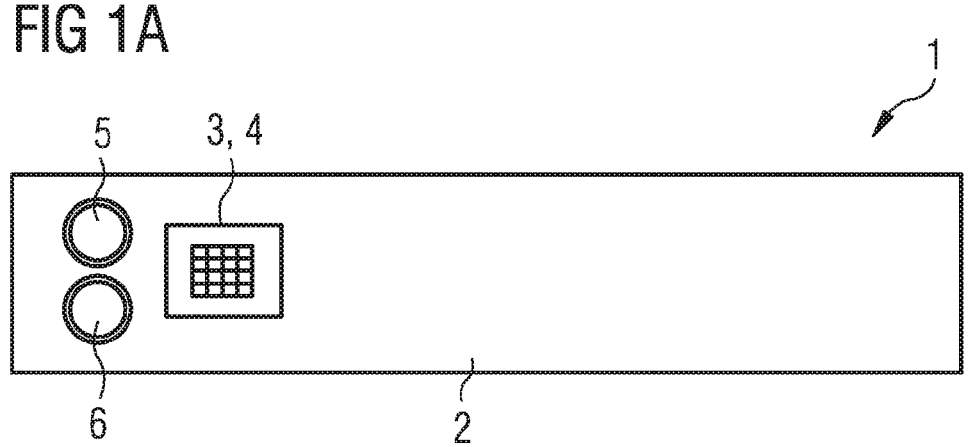
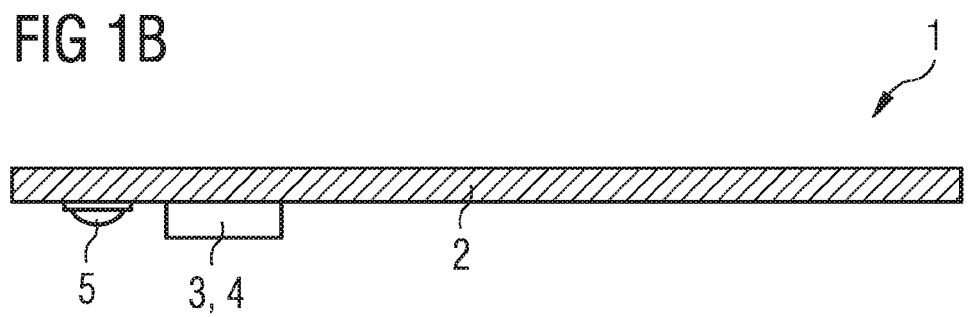
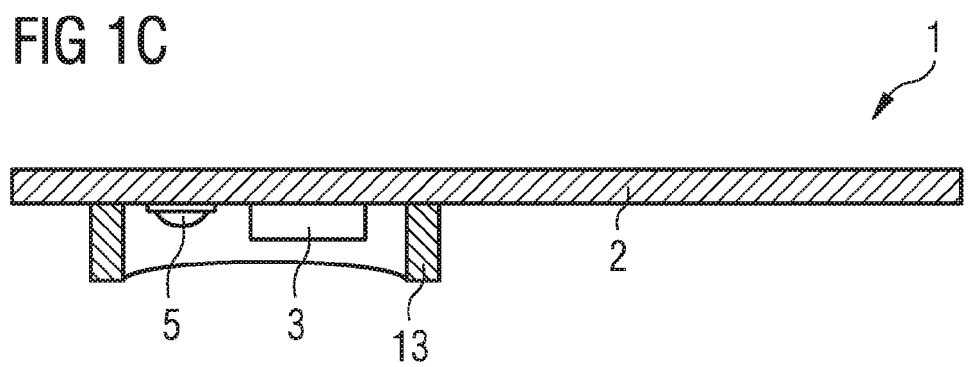

OPTICAL READER DEVICE, TAG FOR USE ON A DISPOSABLE OR REPLACEABLE COMPONENT, OPTICAL DATA VALIDATION SYSTEM AND METHOD FOR OPTICAL DATA VALIDATION

CROSS-REFERENCES TO RELATED APPLICATIONS

This application claims the benefit of priority under 35 U.S.C. § 119 of U.S. Provisional Application No. 62/252,030, filed Nov. 6, 2015, and claims priority to European Patent Application No. 15198476.2 filed on Dec. 8, 2015, all of which are hereby incorporated by reference in their entirety for all purposes.

An aspect of the invention relates to an optical reader device, another to a tag for use on a disposable or replaceable component, and another to an optical genuine article validation and optical discrimination system and to a method for optical genuine article validation and optical discrimination.

BACKGROUND OF THE INVENTION

Product labeling is used in many fields to gain quick and reliable access to various information related to a product. Information includes content and composition of products, and details on a particular aspect of the product to name but a few. Product labeling can support managing automated or semi-automated systems, or can drive human-machine interface operational parameters. Furthermore, products are often supplied with authenticity validation information in order to attribute a product to a certain company, for example.

Customers producing high volumes of consumer products with an even higher volume of disposable or replaceable components have an interest in low cost and simple solutions which at the same time allow robust and reliable data acquisition and authentication of product information.

Traditionally, product labeling involves some sort of code marking which encodes data related to the product at hand. Cost and complexity are often compounded by the need of a dedicated reader to decode data encoded in the respective code marking. Such data validation systems can only be used with a particular code marking scheme and both labeling and hardware can be costly. For example, labels may involve radio-frequency identification (RFID) tags and readers can often only be used with a given tag layout.

SUMMARY OF THE INVENTION

An optical reader device according to the present principle comprises a sensor unit and a signal processing unit. For example, the sensor unit and the signal processing unit are incorporated into the housing and are electrically interconnected. The sensor unit comprises at least one light source, and an optical sensor arrangement.

For example, the housing comprises an aperture. The light source, the optical sensor arrangement can be arranged behind or adjacent to the aperture so that light, emitted by the light source and returned from outside the housing, can strike or leave the housing by means of the aperture. For example, the aperture can be covered by a glass cover, or flat- or optically shaped opening or lens. This way the circuitry in the sensor can be isolated from the environment. It is even possible to fine-tune optical properties of the optical reader device.

The optical sensor arrangement can be arranged as an optical sensor array or as individual sensors, e.g. comprising a single multi-spectral optical sensor or at least a first optical sensor and a second optical sensor capable of detecting UV, VIS and IR spectra. For example, an optical sensor comprises a single photo-diode or an array of several photo-diodes. The at least one light source comprises at least one light emitting component. For example, the light emitting component can be one or more light emitting diodes (LED) emitting light in the (near) infrared, visible or ultra-violet (UV) range of the electromagnetic spectrum. Furthermore, the light source may comprise a single or more than a single (LED or non LED) light emitting component. The signal processing unit comprises a microcontroller, a signal processor, a logic engine, an application-specific integrated circuit or the like, for example.

The optical sensor arrangement is sensitive to light emitted by the light source, e.g. at least partly sensitive to infrared, visible and/or UV radiation. The optical sensor arrangement can be equipped with one or more filter layers, for example, which further define their wavelength dependent sensitivity. When using multiple optical sensors they can be of the same type but may have different spectral sensitivity.

During operation the light source, by means of the at least one light emitting component, emits light, for example through an aperture in the housing. The emission can be continuous or pulsed. Furthermore, the light source may only emit light when called by the signal processing unit, e.g. the microcontroller, for example, by user request. However, light can also be emitted continuously without any interruption for as long as the optical reader device is turned on.

The optical sensor arrangement is arranged for generating a first sensor signal. The first sensor signal is indicative of light emitted from the light source and reflected back from a code marking to be placed in front of the aperture in a determined distance. Depending on the properties of the code marking a higher or lower amount of light is reflected and can be used to decode data which was previously encoded into the code marking. For example, the code marking comprises different levels of grayscales wherein the grayscales correlate to data values.

The predetermined distance between the code marking and the optical reader device can be established by means of the aperture. For example, for generation of the first sensor signal the code marking needs to be placed in close vicinity or even in direct contact to the aperture. The aperture could be in a shroud on the housing or may be flush with the main surface of the optical reader device. In the predetermined distance the optical reader device generates a calibrated signal intensity allowing for unique attribution of the first sensor signal to correlated data values. Calibration can be adjusted by means of the signal processing unit.

The optical sensor arrangement is further arranged for generating a second sensor signal. The second sensor signal is different and distinguishable from the first sensor signal; it is indicative of light emitted by a photo-responsive taggant of the tag. The light is emitted by the photo-responsive taggant after being excited by the light emitted from the light source.

The photo-responsive taggant is based on a material which can be excited by means of the light emitting component. For example, the material may be fluorescent or may undergo photo-induced chemical reactions followed by the emission of light. Furthermore, the material may also reflect more or less of incident light at a given wavelength or may have some other light-reactive or photo-reactive property. Typically, light emitted by the taggant has a specific wavelength characteristic and, thus, by means of its spectral properties allows unambiguous identification of its presence. For example, emission of light typically is shifted or redshifted with respect to the wavelength of excitation. Thus, by means of different types of sensors or filter layer, reflected light can be distinguished from light emitted by the photo-responsive taggant. The presence of the taggant indicated by the second sensor signal can be used for authentication validation, for example, attribution of the origin of a certain product to a specific company.

The signal processing unit is arranged to process the first and second sensor signals. For example, the signal processing unit decodes encoded data from the code marking for further use by the user. For example, the optical reader can be equipped with a display on which the decoded data is displayed. Furthermore, the signal processing unit indicates the presence of the photo-responsive taggant which adds yet another level of information which can be displayed or further processed by the optical reader device.

The signal processing of both the first and second optical sensor signals offers decoding of encoded data or information as well as taggant presence validation in a simple manner. The optical reader device can be equipped with many different optical sensors and can be adapted by means of appropriate programming or configuration of the signal processing unit. This renders data decoding and validation simple, yet robust and low-cost.

In one embodiment the optical sensor arrangement comprises a first optical sensor with a single output reference or with multiple output references. For example, the first optical sensor is a multi-spectral sensor. Both the first and second sensor signals can be provided at the single output reference or with multiple output references, respectively. Alternatively, the optical sensor arrangement comprises at least the first optical sensor and a second optical sensor each with a single output reference or with multiple output references. Both the first and second sensor signals can be provided at the single output reference or with multiple output references, respectively.

In an embodiment of the optical reader device the first optical sensor comprises a proximity sensor.

Typically, proximity sensors detect and measure reflected electromagnetic radiation to detect the presence of an object or person. The devices often include an integrated LED driver and an externally connected or integrated LED. Optical proximity sense devices can be repurposed to detect reflections from the code marking, for example as grayscale reading devices, when utilized at close range to the surface of the code marking. The first sensor signal then corresponds to a proximity data value which indicates the amount of light reflected back from the code marking.

In one embodiment of the optical reader device the second optical sensor comprises a color sensor.

Color sensors are devices used for color measurement, determination, and discrimination, for example, by red, green, blue and clear (RGBC) light sensing. The respective sensor signal (or more sensor signal in case of different color channels) can be used to deduce spectral information such as the presence of a given photo-responsive taggant. The colour sensor can be spectral or wavelength-specific. In other words an integral sensor response may be dependent on wavelength due to properties of the sensor material. Or the sensor response can be altered by using corresponding filters, for example red, green, blue or any other set of filters. The color sensor can also be used to determine finite colors or spectral content specific to data content alongside or as a complement to the taggant recognition function.

The color sensor can be adjusted with respect to the at least one light emitting component, e.g. by being sensitive to a defined wavelength or wavelength region. This way, the color sensor can be used for validating the presence of photo-responsive taggants which typically emit in a defined wavelength when excited with the light of appropriate energy. The taggant can be used for verifying genuine articles which can be marked with the photo-responsive taggants. The taggant can be invisible to the naked eye.

In an embodiment of the optical reader device the sensor unit and the signal processing unit are electrically interconnected and are mounted to a printed circuit board incorporated into the housing.

The light source, the first optical sensor and the second optical sensor are separated by an optical light barrier. This way light emitted by the light source is blocked as much as possible from directly reaching the first optical sensor and the second optical sensor. The optical light barrier is intended to prevent light giving rise to unwanted sensor signal and serves as a means for light steering. This implementation effectively reduces optical crosstalk between the components which improves on detection reliability.

In an embodiment of the optical reader device the light source comprises the at least one light emitting component and a further light emitting component. For example, one or more of the light emitting components are designed as a light emitting diodes emitting infrared, visible or UV radiation. It is also possible that the light source emits a single color, such as red, green, or blue.

An emission wavelength of the at least one light emitting component is arranged such that the light striking the code marking of the tag is at least partly reflected. Furthermore, in emission wavelength of the further light emitting component is arranged such as to excite the photo-responsive taggant of the tag.

In an embodiment of the optical reader device the first optical sensor and the second optical sensor are integrated in a first and a second integrated circuit, respectively. Alternatively, the first optical sensor and the second optical sensor are integrated into a single, common integrated circuit.

The taggant for use on a disposable or replaceable component according to the present principle comprises a carrier surface having a first label section and a second label section.

The first label section comprises a code marking being representative of encoded data to be decoded by means of an optical reader device. The code marking comprises a pattern based on a light reflecting material, for example an ink. The pattern comprises at least a first and a second scaling level to represent the encoded data. The different scaling are achieved by different amounts of the light effecting material and determine distinct levels of reflectivity, respectively. Typically, the pattern is a gray-scale area of given density representing the encoded data.

The second label section comprises at least one photo-responsive taggant which can be excited by means of the optical reader device, for example, by means of an appropriate light source emitting light at a specific wavelength.

The first and second label section can be arranged on different parts of the carrier surface. However, the first and second label section can be combined into a single section and the reflecting material may have photo-responsive taggant properties as well.

In an embodiment of the tag the first label section and the second label section are printed onto or deposited to the disposable or replaceable component.

In an embodiment of the tag the at least first and second scaling levels of the code marking represent the encoded data as grayscale encoded data. Typically, the tag comprises a gray-scale area representing the encoded data, and either a separate or integrated taggant field.

In an embodiment of the tag the light reflecting material and/or the photo-responsive taggant comprises at least one of the following components: a film, a paint, a dye, a colloid, an ink, one or more pigments, one or more nano particles, one or more quantum dots and/or a mixture thereof. In particular, the ink may be a fluorescent ink, a security ink, a liquid ink, a solid ink, a thermally-bonded ink or a dual ink.

The light reflecting material and/or the photo-responsive taggant can have similar or essentially the same optical properties. For example, the light reflecting material and photo-responsive taggant can both be reflective and photo-responsive at the same time. In this case the same material can be used for both first and second label sections.

In an embodiment of the tag the light reflecting material comprises the at least one photo-responsive taggant. This way it the functionality of data validation and authentication using the code marking and photo-responsive taggant, respectively, can be combined into a single material which can easily be printed or deposited on the tag.

In an embodiment the tag is part of a product label attached to or printed or deposited onto the disposable or replaceable component. The first label section and/or the second label section can either be a single section or separate sections on the product label or are comprised by a label art section.

An optical data validation system according to the principle presented comprises an optical reader device and a tag according to the aforementioned principles. Furthermore, the signal processing unit, e.g. the microcontroller, is arranged to decode the encoded data from the first sensor signal. Moreover, the signal processing unit is also arranged to provide an authenticity validation information from the second sensor signal.

A method for optical genuine article validation and optical discrimination according to the principle presented comprises several steps. A first step involves placing a tag of a disposable or replaceable component into a determined distance with respect to at least one light emitting component, for example residing behind or adjacent to an aperture situated in a housing of an optical reader device. Then light is emitted from at least one light emitting component, for example through the aperture and onto the tag.

The emission of light from the light emitting component eventually leads to the generation of two sensor signals. A first sensor signal is generated by means of an optical sensor arrangement in the optical reader device and depends on an amount of light reflected back from a code marking. A second sensor signal is generated by means of the optical sensor arrangement in the optical reader device and depends on an amount of light emitted by a photo-responsive taggant of the tag after being excited by the light emitted from the light source.

Finally, the first sensor signal and the second sensor signal of processed by means of a signal unit, e.g. by means of a microcontroller, a logic or signal processor, arranged in the optical reader device.

In an embodiment of the method the processing involves decoding encoded data from first sensor signal. The data is encoded by means of the code marking of the tag. In particular, the encoded data is encoded by means of a gray-scaling pattern of the code marking. In a further step, and authenticity validation information is provided from the second sensor signal.

Using the code marking assessment and photo-responsive taggant presence validation technologies introduced above together in a simplified solution to provide both encoded data and authenticity validation at a low solution cost has many advantages. It is inexpensive and efficient in view of space, production implementation and functionality.

For example, the taggant and code marking, especially as implemented by a grayscale marking with adjacent or integrated taggant, could be done as a standalone tag or could be incorporated in item branding artwork. The sensor unit can be realized as a single integrated component which allows customers to integrate optical readers in their products at costs that are a fraction of the cost of barcode readers and other technologies.

The product marking portion of the solution or the tag may employ grayscale printed ink or colored ink in varying density with the taggant either integrated in the ink or printed in the same viewing space on the item of interest to support data delivery and taggant presence verification at the same time. The grayscale data portion in the code marking can be single dimensional and simple, and can be used for the purpose of managing automated or semi-automated systems, or driving human machine interface operational parameters, to note two specific examples of use value.

Existing solutions typically have a much higher cost barcode or other technology that is not production friendly, and which cannot be added to customer solutions in their existing production flow. Multisensor solutions and special tags or complex marking and reading schemes are cost and space challenges for product designers and manufacturers. The optical reader device provides a solution for combined encoding data by means of the code marking and photo-responsive taggant and can be accomplished in a very small physical footprint. Furthermore, the code marking can also be accomplished in a very small physical footprint. The principle presented above thus provides both encoded data and taggant validation functions in a single, easy to implement, low-cost product site marking solution, and supports reading and validation using an advantageously low-cost optical reader and tag solution.

BRIEF DESCRIPTION OF THE DRAWINGS

In the following, the principle presented above is described in further detail with respect to drawings, in which exemplary embodiments are presented.

FIG. 1A shows a top view of an exemplary embodiment of an optical reader device.

FIG. 1B shows a side view of the optical reader device.

FIG. 1C shows a side view of an alternative optical reader.

DETAILED DESCRIPTION

Figure 2A:
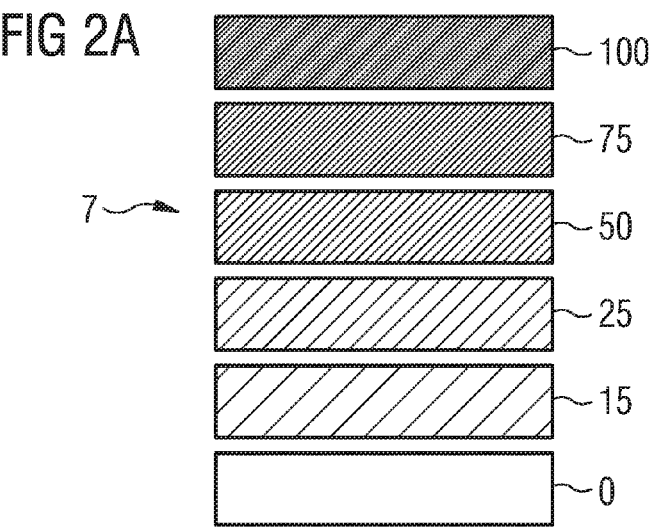
FIG. 2A shows a first exemplary embodiment of a code marking.

FIG. 1A shows a top view of an exemplary embodiment of an optical reader device 1. The device comprises a printed circuit board 2, a color and proximity sense device 3, 4 and a light source 5, 6. The printed circuit board 2 provides electrical interconnection between the components. The color and proximity sense device 3, 4 comprises a color sensor 4 and a proximity sensor 3 in a single integrated circuit.

The light source 5, 6 comprises one or two light emitting components, a proximity emitter 5 and a taggant excitation emitter 6. Both light emitting components are arranged to emit light of a specific wavelength or wavelengths range, respectively. The emission wavelength is chosen according to the sensitivity of color and proximity sensor, respectively. Typically, the proximity emitter 5 emits light of a first wavelength and the taggant excitation emitter 6 emits light of a second wavelength. Generally, the first and second wavelength are different but can also be the same depending on the actual implementation. Emission wavelengths can be in the visual, like red, blue, and green, or infrared, UV or a mixture thereof, for example, white light.

The proximity sensor 3 is sensitive to light to be emitted by the proximity emitter 5. The proximity sensor 3 comprises one or more photodiodes, or similar light sensitive components. In fact, the proximity sensor 3 is arranged to detect light emitted by the proximity emitter 5 and reflected back by an external means, such as a proximity target. The sensor signal generated by one or more of these photodiodes will be denoted first sensor signal hereinafter. The proximity target in this particular embodiment constitutes a tag, e.g. on a disposable or replaceable component, having one or more sections comprising a code marking 7. This will be discussed in further detail below.

The color sensor 4 is sensitive to different wavelengths and may have several channels which can be attributed to certain main wavelengths. For example, the color sensor 4 comprises light sensitive components which may be sensitive to a mainly red, green, or blue part of the electromagnetic spectrum, respectively. The individual light sensitive components give rise to a respective sensor signals which can be attributed to the aforementioned channels. These sensor signals taken together will be denoted second sensor signal hereinafter.

The light emitting components of the light source 5, 6 and the color and proximity sense device 3, 4 may be separated from each other by means of optical light barriers 8 (not shown). The optical light barriers 12 are means to reduce optical crosstalk between the individual components mentioned above. Furthermore, the integrated circuit comprising the color and proximity sense device can also include optical light barriers on-chip or as part of the package including the chip.

FIG. 1B shows a side view of the optical reader device 1 introduced above. The printed circuit board 2 extents along a main surface. The light emitting components 5, 6 and the color and proximity sense device 3, 4 are arranged at an end of the printed circuit board 2. The remaining part of the printed circuit board constitutes an arm by which the optical reader device can be moved over a tag, for example. The printed circuit board 2 is used to electrically connect the light emitting components 5, 6 and the color and proximity sense device 3, 4. Not shown in the drawing is a microcontroller or signal processor (or the like), i.e. the signal processing unit, used to operate and control the light emitting components 5, 6 and sensor devices 3, 4.

FIG. 1C shows a side view of an alternative optical reader device 1. This device comprises the same electronic components as the device introduced in FIG. 1A. However, the light source 5, 6 and sensors 3, 4 are confined by a shroud 13 having an aperture. The purpose of the shroud is at least twofold. First, it allows for protection of the electronic components from environmental influences. For example, the shroud 13 minimizes the impact of ambient lighting or other sources of optical crosstalk. Second, the shroud 13 allows to place an external object in front of the optical reader device 1 in a predetermined distance. The predetermined distance is basically defined by the height of the shroud 13 with respect to the main axis of the printed circuit board 2. By means of the aperture light can either leave or enter the optical reader device 1.

FIGS. 1A, 1B, and 1C show a housing of the optical reader device 1. In fact, the printed circuit board 2 can be part of the housing or be integrated into such. Furthermore, the shroud 13 and aperture can be designed into the housing or be part of the printed circuit board 2. In the latter case the shroud 13 can be a mold structure or package connected to the printed circuit board 2.

Figure 2B:
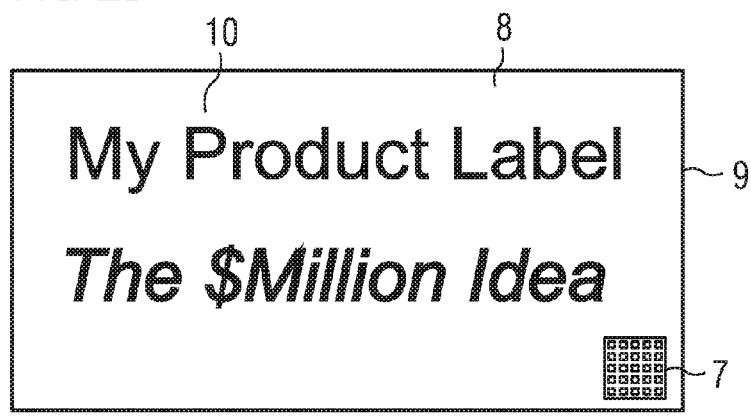
FIG. 2B shows an exemplary embodiment of a tag which can be used on a disposable or replaceable component.
Figure 2C:
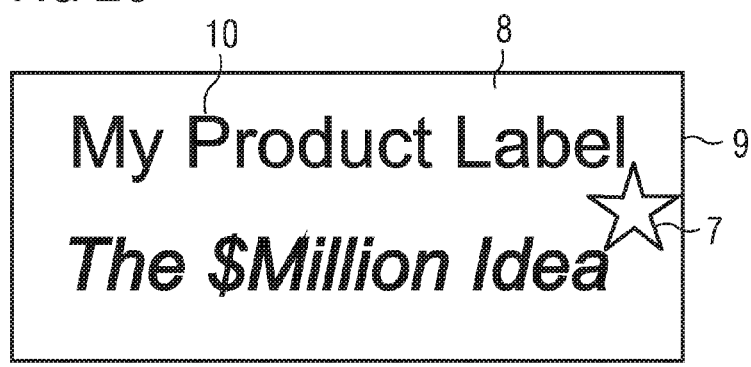
FIG. 2C shows a second exemplary embodiment of an tag which can be used on a disposable or replaceable component.

FIGS. 2A, 2B and 2C show an exemplary embodiment of a tag.

FIG. 2A shows a first exemplary embodiment of a code marking 7. The drawing shows several gray scales 0, 15, 25, 50, 75, 100 ranging from black 100% to white 0% with intermediate levels at 15%, 25%, 50%, and 75%. The different gray scales have different light reflecting properties and can be used for data encoding.

There are different ways to encode data into the code marking 7 by using gray scales. For example, the code marking 7 may only have a single grayscale and its level can be attributed to a certain product or product property. For example, white corresponds to product A, 15% corresponds to product B, and so on. Detection of that single grayscale by means of the optical reader device 1 can then be used to attribute the specific grayscale, i.e. a characteristic level of reflection, to said product or product property.

Alternatively, the data can be encoded into more than a single grayscale level but into a pattern comprising several gray scales as depicted in FIG. 2A. For example, the code marking 7 in this exemplary embodiment comprises six levels which allows to encode 6-bit of data. The sequential arrangement of the gray scales can be a unique representation of data to be encoded. For example, the optical reader device can be moved along the code marking in order to detect the different levels of reflection as a sequence and use this information to decode the data.

The code marking 7, or more precisely the grayscales, are made from a light reflecting material, especially reflecting light emitted from the proximity emitter 5. The light reflecting material comprises an ink, for example, a standard or wavelength specific ink. Using an ink has the advantage that it can be printed or otherwise deposited to a tag by means of printing such as ink jet printing. The data encoding can also be done with color and with varied-density color in addition or alternative to the black-and-white grayscale method.

FIG. 2B shows an exemplary embodiment of a tag which can be used on a disposable or replaceable component. The tag comprises a carrier surface 8. The carrier surface 8 can be based on different materials, e.g. plastic, paper or the like. The drawing shows a tag which is arranged on a product label 9 deposited on or printed on a product. The tag can either be separate to or be an integral part of the product label 9. Furthermore, the tag can be placed as a separate feature and in a dedicated section of the product label 9. Alternatively, the tag can be incorporated in item branding or artwork 10.

The tag comprises a first label section which has the code marking 7. The code marking 7 represents the coded data, in this exemplary embodiment, a pattern of different gray scales such introduced in FIG. 2A. This way the code marking 7 can be printed or deposited onto the carrier surface 8, which may be a sheet of paper or plastic and a separate component or part of the product.

The tag also comprises a second label section. The second label section comprises at least one photo-responsive taggant. The second label section can be separate from the first label section, for example, by being designed into a different portion of the tag. However, the first and second label section can coincide and be placed onto the same portion of the tag.

The taggant comprises a material which can be excited by means of light to be emitted by the light source, i.e. the taggant excitation emitter 6. In turn, the material emits light of the characteristic wavelength or spectrum which allows for unambiguous identification of the taggant's presence.

The materials used for the code marking 7 and the taggant can be different and/or mixed. This way the code marking 7 serves as a light reflecting means and can be excited by light emitted from the taggant excitation emitter 6. The material used for the code marking 7 can even have photo-responsive properties on its own and can be used as a photo-responsive taggant as well. Photo-responsive taggants comprise dies, colloids, fluorescent inks, pigments, nano particles, quantum dots or the like. Typically, the taggant is not visible to the human eye and, thus, is not depicted in the drawing.

FIG. 2C shows a second embodiment of an tag which can be used on a disposable or replaceable component. This embodiment differs from the one discussed above with respect to FIG. 2B only in that the first and second sections of the tag are included into an artwork or branding 10 on the product label 9.

Figure 3A:
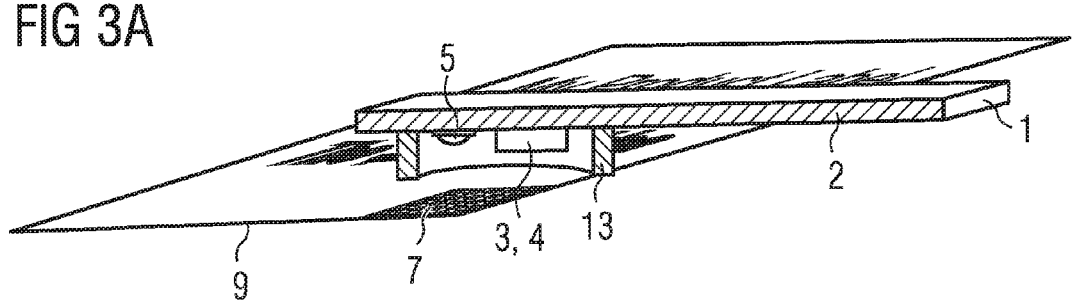
FIG. 3A shows an exemplary operation scheme of an optical reader device.
Figure 3B:
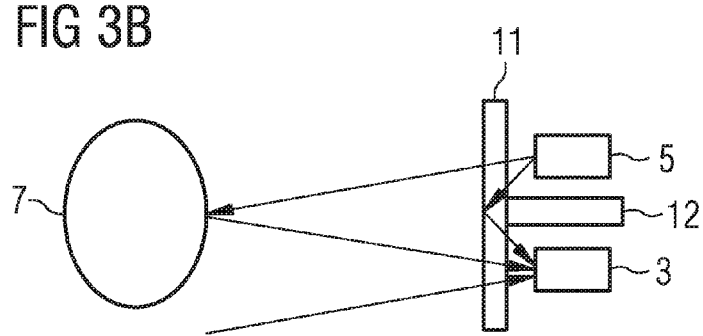
FIG. 3B shows an exemplary emissions scheme of a sensor unit.

FIGS. 3A, 3B and 3B show an exemplary operation scheme of an embodiment of an optical reader device 1.

FIG. 3A shows an exemplary operation scheme of an optical reader device 1. The optical reader device 1 is moved along the tag which is printed or deposited the product, for example in the region of the product label 9. The optical reader device 1 is placed in a determined distance to the tag, in this exemplary embodiment by means of the shroud 13 comprising the sensor unit. The optical reader device 1 can either be placed at a fixed position, i.e. where the tag is situated, or be moved continuously over the tag.

The sensor unit in the optical reader device 1 is used for data acquisition. For that the light source is emitting light onto the tag. The emission of light by means of the light source, i.e. the proximity emitter 5 and the taggant excitation emitter 6, can be pulsed or continuous and either be executed by demand by a user or continuously operating during the time the optical reader device 1 is turned on. The emission of light by means of the proximity emitter 5 and the taggant excitation emitter 6 can happen at the same time, i.e. parallel, or in dedicated subsequent phases, i.e. serial.

FIG. 3B shows an exemplary emissions scheme of a sensor unit. In this example the operation of the proximity sensor 3 is depicted. The principles discussed below can, however, be adapted to the color sensor 4 in an analogous manner.

The proximity emitter 5 and the proximity sensor 3 are separated by an optical light barrier 8. The optical light barrier 8 is opaque and attenuates or prevents as much of the light emitted by the proximity emitter as possible from directly reaching the proximity sensor 3. This way optical crosstalk between the two components is effectively reduced. The proximity emitter 5 and of the proximity sensor 3 are covered by a glass cover 11 which can be attached to the optical light barrier 8 or, more generally, to the aperture in the optical reader device 1. The glass cover 8 prevents direct exposure to ambient environment.

In operation light is emitted from the proximity emitter 5 which leaves the optical reader device 1 via the aperture. The emitted light eventually strikes the tag, i.e. the code marking 7 or taggant in the first and second section, respectively. Due to the properties of the code marking 7 a certain amount of light is reflected back towards the optical reader device 1. If placed in the appropriate distance, i.e. the predetermined distance, a certain amount of light is reflected back and reaches the proximity sensor 3. Depending on the exact amount of light the proximity sensor 3 generates the first sensor signal. This first sensor signal is an indicator of the reflection properties of the code marking 7. As discussed above the code marking 7 comprises a pattern, for example, a gray scale pattern, of different levels of reflectivity which are representative of encoded data. Thus, the first sensor signal is a representation of said encoded data as well. The first sensor signal can be decoded by means of a sensor unit which is also incorporated into the optical reader device 1, for example, by means of a signal processing unit on the printed circuit board 2.

In a similar manner the taggant excitation emitter 4 is emitting light through the aperture towards the tag. If on the tag a photo-responsive active taggant is present, the light emitted by the taggant excitation emitter 4 excites the taggant, in turn, light emitted by the taggant can be collected by the color sensor 6 and gives rise to the second sensor signal. The second sensor signal indicates the presence of the tag which can be used for authenticity validation.

Figure 3C:
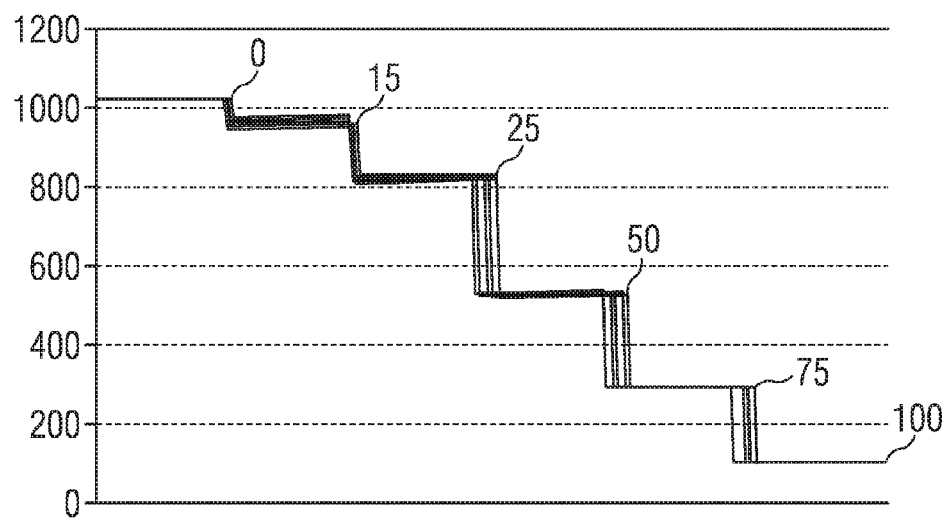
FIG. 3C shows an exemplary measurement using an optical reader device.

FIG. 3C shows an exemplary measurement using an optical reader device 1. The graph shows the amount of light reflected back from a code marking 7 similar to the one depicted in FIG. 2A. The X-axis shows a sample number corresponding to a number of individual measurements taken to collect the data. The Y-axis shows the first sensor signal as units of counts.

The result shows several distinct levels of constant number of counts in the graph representing the first sensor signal. These distinct levels can be attributed to the different grayscales, as discussed above with respect to FIG. 2A. The 6 exemplary grayscales provide approximately 18% average differentials in grayscale density and produce gray-shades which may or may not be recognized as different by the human eye.

The proximity sensor 3 produced distinct and clearly differentiated levels in the first sensor signal between the successively darker or lighter adjacent grayscale blocks. In different measurement approaches the grayscales have been printed by an inkjet printer or a laser printer. Similar results have been obtained by using different tags having as a carrier surface a matt surface or shiny surface. The latter have been achieved by using matt or glossy photographic paper as carrier surface of the tag. Furthermore, different types of inks have been used, for example, laser ink which is a solids-based ink and inkjet ink which normally is dye based.

In more detail, utilizing a red (visible) LED as proximity emitter, the proximity sensor produced distinct and clearly differentiated levels in the first sensor signal between the successively darker or lighter adjacent gray scale blocks (see FIG. 2A) when printed by an inkjet printer or laser printer.

Utilizing an infrared LED as proximity emitter, the proximity sensor produced distinct and clearly differentiated levels in the first sensor signal between the successively darker or lighter adjacent grayscale blocks printed by a laser printer, for example. These the results have been repeatable and impact of ambient light was rather low. It turned out, however, that laser printing showed improved dynamic range and overall results when combined with an infrared illuminator. When using a red illuminator as proximity emitter either printing method offers wide dynamic range and high performance. As a result, grayscale recognition and differentiation method provides a range of cost-effective solutions which can utilize available, production implementable resources.

We claim:

1. An optical genuine article validation and optical discrimination system, comprising:
   an optical reader device comprising:
      a sensor unit, and
      a signal processing unit,
      wherein the sensor unit comprises a light source and an optical sensor arrangement,
      wherein the light source comprises at least one light emitting component and is arranged for emitting light,
      wherein the optical sensor arrangement is arranged for generating a first sensor signal indicative of light emitted from the light source and reflected back from a code marking of a tag to be placed in front of the light source in a determined distance, the first sensor signal corresponding to grayscale assessment of data content,
      wherein the optical sensor arrangement is further arranged for generating a second sensor signal indicative of light emitted by a photo-responsive taggant of the tag after being excited by the light emitted from the light source,
      wherein assessment of the photo-responsive taggant and the grayscale assessment are implemented in a single integrated circuit, and
      wherein the signal processing unit is arranged to process the first sensor signal and the second sensor signal; and
   a tag for use on a disposable or replaceable component, the tag comprising a carrier surface having a first label section and a second label section, wherein
      the first label section comprises a code marking being representative of encoded data to be decoded by means of the optical reader device,
      the code marking comprises a pattern based on a light reflecting material,
      the pattern comprises at least a first and a second scaling level to represent the encoded data and comprising different amounts of the light reflecting material to determine distinct levels of reflectivity, respectively, and
      the second label section comprises at least one photo-responsive taggant to be excited by means of the optical reader device,
   wherein the signal processing unit is arranged to decode the encoded data from the first sensor signal, and
   wherein the signal processing unit is arranged to provide an authenticity validation information from the second sensor signal.

2. The optical genuine article validation and optical discrimination system according to claim 1, wherein the optical sensor arrangement comprises:
   a first optical sensor with a single output reference or with multiple output references for providing the first sensor signal and the second sensor signal, respectively, or
   at least the first and a second optical sensors each with a single output reference or with multiple output references for providing the first sensor signal and the second sensor signal, respectively.

3. The optical genuine article validation and optical discrimination system according to claim 2, wherein the second optical sensor comprises a color sensor and the first optical sensor comprises a proximity sensor, the color sensor and the proximity sensor being implemented in the single integrated circuit.

4. The optical genuine article validation and optical discrimination system according to claim 2, wherein the sensor unit and the signal processing unit are electrically inter-connected and are mounted to a printed circuit board incorporated into a housing, and
   wherein the light source, the first optical sensor and the second optical sensor are separated by an optical light barrier such that light emitted by the light source is at least partly blocked from directly reaching the first optical sensor and the second optical sensor.

5. The optical genuine article validation and optical discrimination system according to claim 2, wherein the first optical sensor and the second optical sensor are integrated in a first and a second integrated circuit, respectively, or the first optical sensor and the second optical sensor are integrated into a single, common integrated circuit.

6. The optical genuine article validation and optical discrimination system according to claim 1, wherein the light source comprises the at least one light emitting component and a further light emitting component; in particular, designed as light emitting diodes,
   wherein an emission wavelength of the at least one light emitting component is arranged such that light striking the code marking of the tag is at least partly reflected, and
   wherein an emission wavelength of the further light emitting component is arranged such as to excite the photo-responsive taggant of the tag.

7. The optical genuine article validation and optical discrimination system according to claim 1, wherein the signal processing unit comprises a micro-controller, a logic engine, a processing engine and/or an application-specific integrated circuit.

8. The optical genuine article validation and optical discrimination system according to claim 1,
   wherein the at least first and second scaling levels of the code marking represent the encoded data as grayscale encoded data, and
   wherein assessment of the at least one photo-responsive taggant and grayscale assessment are implemented in a single integrated circuit.

9. The optical genuine article validation and optical discrimination system according to claim 1, wherein the first label section and the second label section are printed onto or attached to the disposable or replaceable component.

10. The optical genuine article validation and optical discrimination system according to claim 1, wherein the light reflecting material comprises at least one of the following components:

a dye,
a colloid,
an ink, in particular, a fluorescent ink, a security ink, a liquid ink, a solid ink, a thermally-bonded ink, or a dual ink,
one or more pigments,
one or more nanoparticles,
one or more quantum dots,
a paint,
a film, and/or
a mixture thereof.

11. The optical genuine article validation and optical discrimination system according to claim 1, wherein the light reflecting material comprises the at least one photo-responsive taggant.

12. The optical genuine article validation and optical discrimination system according to claim 1, wherein the tag is comprised by a product label deposited on or printed onto the disposable or replaceable component, and
wherein the first label section and/or the second label section are either separate sections of the product label or are comprised by a label-art section.

13. The optical genuine article validation and optical discrimination system according to claim 1, wherein the code marking is representative of encoded data, comprises at least one scaling level to represent the encoded data, and comprises different amounts of light reflecting material to determine distinct levels of reflectivity, respectively.

14. A method for optical data validation, comprising the steps of:
placing a tag of a disposable or replaceable component into a determined distance with respect to at least one light emitting component of an optical reader device, the optical reader device comprising the at least one light emitting component, an optical sensor arrangement and a signal processing unit;
emitting light from the at least one light emitting component onto the tag;
generating a first sensor signal by means of the optical sensor arrangement depending on an amount of the light reflected back from a code marking of the tag, the first sensor signal corresponding to grayscale assessment of data content;
generating a second sensor signal by means of the optical sensor arrangement depending on an amount of light emitted by a photo-responsive taggant of the tag after being excited by the light emitted from the at least one light emitting component; and
processing the first sensor signal and the second sensor signal by means of the signal processing unit arranged in the optical reader device,
wherein assessment of the photo-responsive taggant and the grayscale assessment are implemented in a single integrated circuit.

15. A method according to claim 14, wherein the processing comprises:
decoding encoded data from first sensor signal, wherein the data is encoded by means of the code marking of the tag, in particular, by means of a gray-scaling pattern of code marking; and
providing an authenticity validation information from the second sensor signal.

* * * * *